US012811462B2

(12) United States Patent
Hotsuta

(10) Patent No.: US 12,811,462 B2
(45) Date of Patent: Nov. 24, 2026

(54) STATOR WITH A WINDING HOLDING PORTION

(71) Applicant: DENSO CORPORATION, Kariya-city (JP)

(72) Inventor: Kouji Hotsuta, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 930 days.

(21) Appl. No.: 18/083,887

(22) Filed: Dec. 19, 2022

(65) Prior Publication Data

US 2023/0123575 A1 Apr. 20, 2023

Related U.S. Application Data

(63) Continuation of application No. PCT/JP2021/025544, filed on Jul. 7, 2021.

(30) Foreign Application Priority Data

Jul. 14, 2020 (JP) ................................ 2020-120690
May 18, 2021 (JP) ................................ 2021-084096

(51) Int. Cl.
*H02K 3/52* (2006.01)

(52) U.S. Cl.
CPC ......... *H02K 3/522* (2013.01); *H02K 2203/12* (2013.01)

(58) Field of Classification Search
CPC ........... H02K 3/52; H02K 3/521; H02K 3/522
See application file for complete search history.

(56) References Cited

U.S. PATENT DOCUMENTS

2006/0022550 A1* 2/2006 Otsuji .................... H02K 3/522 310/194
2006/0043806 A1* 3/2006 Torii ...................... H02K 3/522 310/194
2015/0263579 A1* 9/2015 Sengiku .................. H02K 3/52 310/71

FOREIGN PATENT DOCUMENTS

EP 3404805 A1 * 11/2018 ............... H02K 5/22
JP 2008-278636 11/2008

* cited by examiner

*Primary Examiner* — Tulsidas C Patel
*Assistant Examiner* — Robert E Mates
(74) *Attorney, Agent, or Firm* — Nixon & Vanderhye P.C.

(57) ABSTRACT

A stator includes a stator core having a plurality of teeth, a plurality of windings having coils wound around the teeth, a winding holding portion for holding a part of the winding, and a plurality of coil terminals having a winding connection portion connected to the winding. A first end portion and a second end portion of the winding are wound around the same winding holding portion and held thereon. The winding has two or more coils between the first end portion and the second end portion.

7 Claims, 13 Drawing Sheets

STATOR WITH A WINDING HOLDING PORTION

CROSS-REFERENCE TO RELATED APPLICATIONS

This application is a continuation application of International Patent Application No. PCT/JP2021/025544 filed on Jul. 7, 2021, which designated the U.S. and based on and claims the benefits of priority of Japanese Patent Application No. 2020-120690 filed on Jul. 14, 2020 and Japanese Patent Application No. 2021-084096 filed on May 18, 2021. The entire disclosure of all of the above applications is incorporated herein by reference.

TECHNICAL FIELD

The present disclosure relates to a stator.

BACKGROUND

In the stator of an inner rotor type rotary electric machine, one winding is provided for each tooth. One end portion of the winding is connected to one of the two coil terminals provided on one tooth, and the other end portion of the winding is connected to the other of the two coil terminals.

SUMMARY

The present disclosure is a stator of a rotary electric machine, which includes a stator core having a plurality of teeth, a plurality of windings having a coil wound around the tooth, a plurality of winding holding portions for holding a part of the windings, and a plurality of coil terminals having a winding connection portion connected to the winding. A first end portion and a second end portion of the winding are wound and held around same winding holding portion. The winding has two or more coils between the first end portion and the second end portion.

BRIEF DESCRIPTION OF DRAWINGS

The above and other objects, features and advantages of the present disclosure will become more apparent from the following detailed description made with reference to the accompanying drawings.

In the drawings.

DETAILED DESCRIPTION

Figure 1:
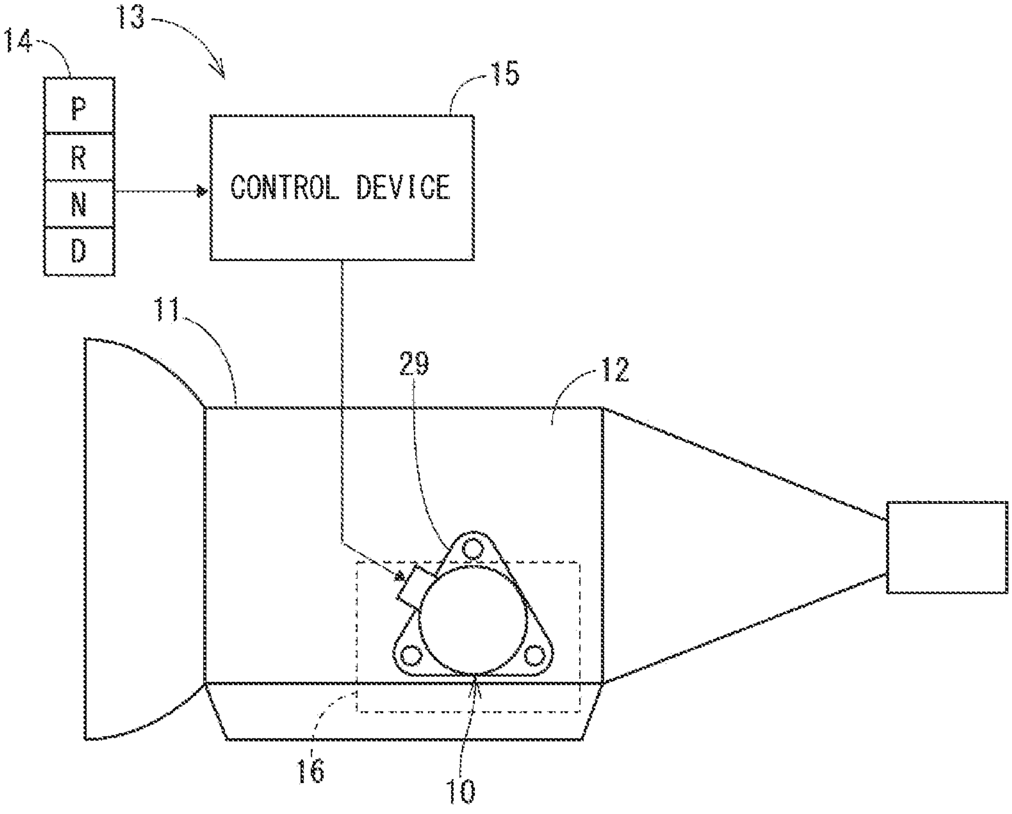
FIG. 1 is a schematic diagram illustrating a shift-by-wire system to which a rotary actuator with a stator of a first embodiment is applied.

In an assumable example, in the stator of an inner rotor type rotary electric machine, one winding is provided for each tooth. One end portion of the winding is connected to one of the two coil terminals provided on one tooth, and the other end portion of the winding is connected to the other of the two coil terminals.

When one winding is provided for each tooth, two coil terminals are required for each tooth. In addition, the number of terminal processes for connecting the end of the winding to the coil terminal also increases. Therefore, the number of parts and the manufacturing man-hours increase. The present disclosure is to provide a stator capable of reducing the number of parts and manufacturing man-hours.

The present disclosure is a stator of a rotary electric machine, which includes a stator core having a plurality of teeth, a plurality of windings having a coil wound around the tooth, a plurality of winding holding portions for holding a part of the windings, and a plurality of coil terminals having a winding connection portion connected to the winding. A first end portion and a second end portion of the winding are wound and held around the same winding holding portion. The winding has two or more coils between the first end portion and the second end portion.

As a result, one winding is provided over two or more teeth, so there is no need to provide two coil terminals for each tooth and the number of coil terminals and the number of winding terminations are reduced. Therefore, the number of parts and the manufacturing man-hours can be reduced. In addition, since the first end portion and the second end portion are wound around same winding holding portion and held thereon, the number of the winding holding portions can be reduced, compared to the configuration in which the second end portion is wound around a place different from the first end portion.

Hereinafter, a plurality of embodiments of the stator will be described with reference to the drawings. In the embodiments, components which are substantially similar to each other are denoted by the same reference numerals and redundant description thereof is omitted.

First Embodiment

As shown in FIG. 1, a motor 30 as an inner rotor type rotary electric machine of a first embodiment is provided in a rotary actuator (hereinafter, actuator) 10. The actuator 10 of the first embodiment is fixed to an outer wall of a case 12 of a vehicle transmission 11 and is used as a power source of a shift-by-wire system 13. In the shift-by-wire system 13, a control device 15 controls the actuator 10 in response to a command signal from a shift operation device 14 to operate a shift range switching mechanism 16 of the transmission 11 to switch a shift range.

(Actuator)

First, an overall configuration of the actuator 10 will be described with reference to FIG. 2. The actuator 10 includes a housing 20, a motor 30, and a speed reducer 40.

The housing 20 has a cup-shaped front housing 21 and a cup-shaped rear housing 22. An opening of the front housing 21 and an opening of the rear housing 22 are combined, and the front housing 21 and the rear housing 22 are fastened to each other by bolts 23. A bottomed cylindrical metal plate 24 is inserted into the front housing 21. The rear housing 22 has a tubular protrusion 28 that projects to an opposite side of the front housing 21. A bracket 29 is fixed to an outer wall of the rear housing 22. The actuator 10 is fixed to the case 12 (see FIG. 1) of the transmission 11 by using the bracket 29.

The motor 30 has a stator 31 and a rotor 34. The stator 31 has a stator core 32 fixed to the metal plate 24 by, for example, press fitting, and a winding 33 provided on the stator core 32. The rotor 34 has a rotary shaft 37 rotatably supported around a rotation axis AX1 by a motor side bearing 35 and a speed reducer side bearing 36, and a rotor core 38 fitted and fixed to an outside of the rotary shaft 37. The motor side bearing 35 is provided on the metal plate 24. The speed reducer side bearing 36 is provided on an output member 44, which will be described later.

The speed reducer 40 includes an eccentric shaft 41, a ring gear 42, an eccentric gear 43, an output member 44, and a transmission mechanism 45. The eccentric shaft 41 is provided on an eccentric axis AX2 that is eccentric with respect to the rotation axis AX1, and is integrally formed with the rotary shaft 37. The ring gear 42 is provided coaxially with the rotation axis AX1 and is fixed to the rear housing 22. The eccentric gear 43 has an external tooth portion 47 that meshes with an internal tooth portion 46 of the ring gear 42, and is supported by a bearing 48 provided on the eccentric shaft 41 so as to allow a planetary motion. The planetary motion is a motion that revolves around the rotation axis AX1 while rotating around the eccentric axis AX2. The rotation velocity of the eccentric gear 43 during planetary motion is changed with respect to the rotation speed of the rotary shaft 37.

The output member 44 is provided coaxially with the rotation axis AX1 and is rotatably supported by a bearing 49 provided in the rear housing 22. The transmission mechanism 45 is composed of an engaging protrusion 51 formed in the eccentric gear 43 and an engaging hole 52 formed in the output member 44 into which the engaging protrusion 51 is inserted, and transmits the rotation of the eccentric gear 43 around the eccentric axis AX2 to the output member 44.

In the actuator 10, a rotating magnetic field is generated by switching an energizing phase of the winding 33, and the rotor 34 rotates under the magnetic attraction force or the reaction force generated by the rotating magnetic field. When the eccentric shaft 41 rotates around the rotation axis AX1 together with the rotor 34, the eccentric gear 43 makes a planetary motion, and the rotation of the eccentric gear 43 decelerated with respect to the rotation of the rotor 34 is output from the output member 44 to the outside.

(Stator)

Next, the stator 31 and its wiring will be described with reference to FIGS. 2 to 7. In the following description, a direction parallel to a rotation axis AX1 is simply described as "axial direction", a direction around the rotation axis AX1 is simply described as "circumferential direction", and a direction orthogonal to the rotation axis AX1 is simply described as "radial direction". Further, a portion outside the component of the actuator 10 is referred to as "outside".

Figure 2:
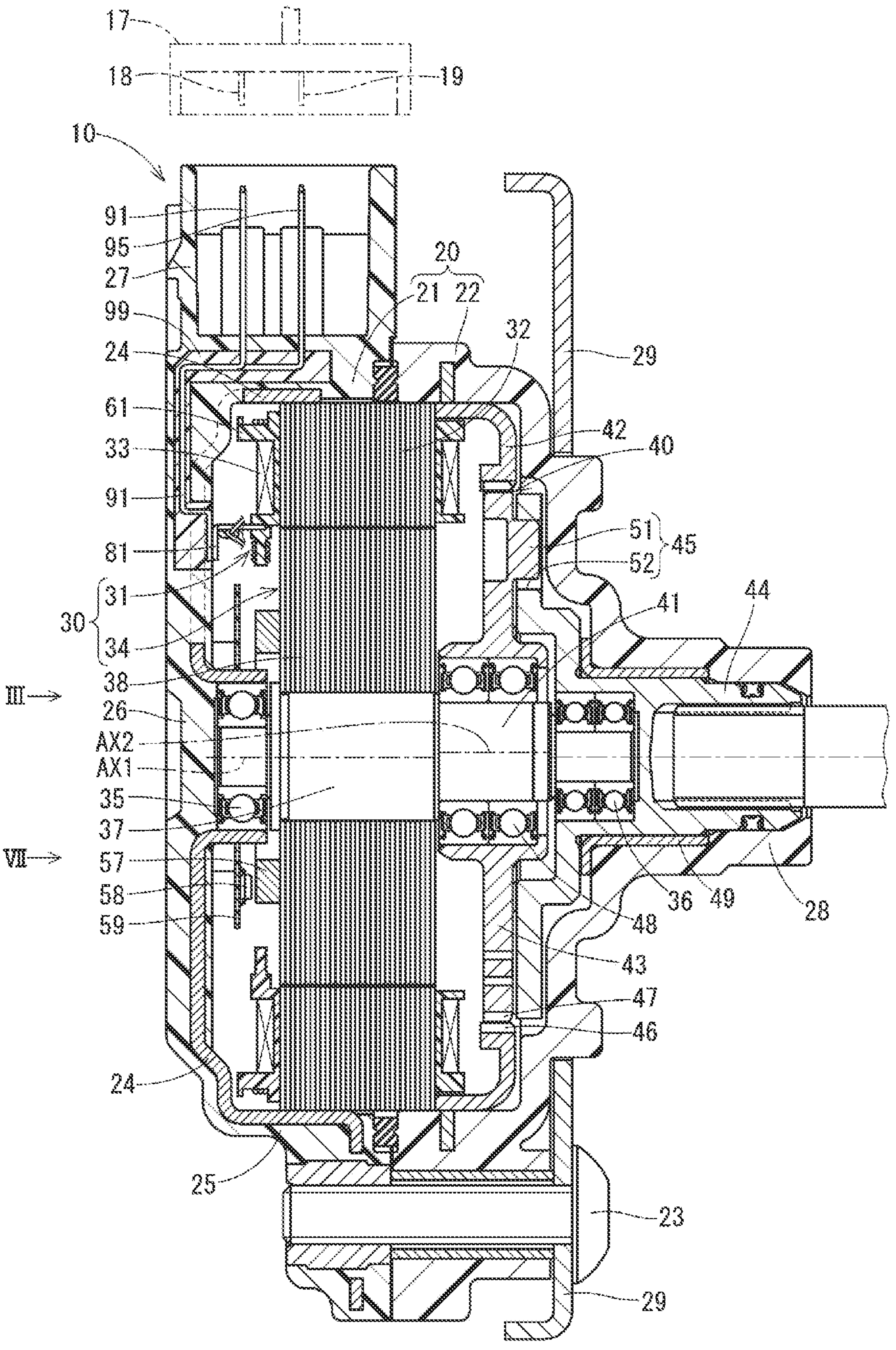
FIG. 2 is a cross-sectional view of the rotary actuator of FIG. 1.
Figure 3:
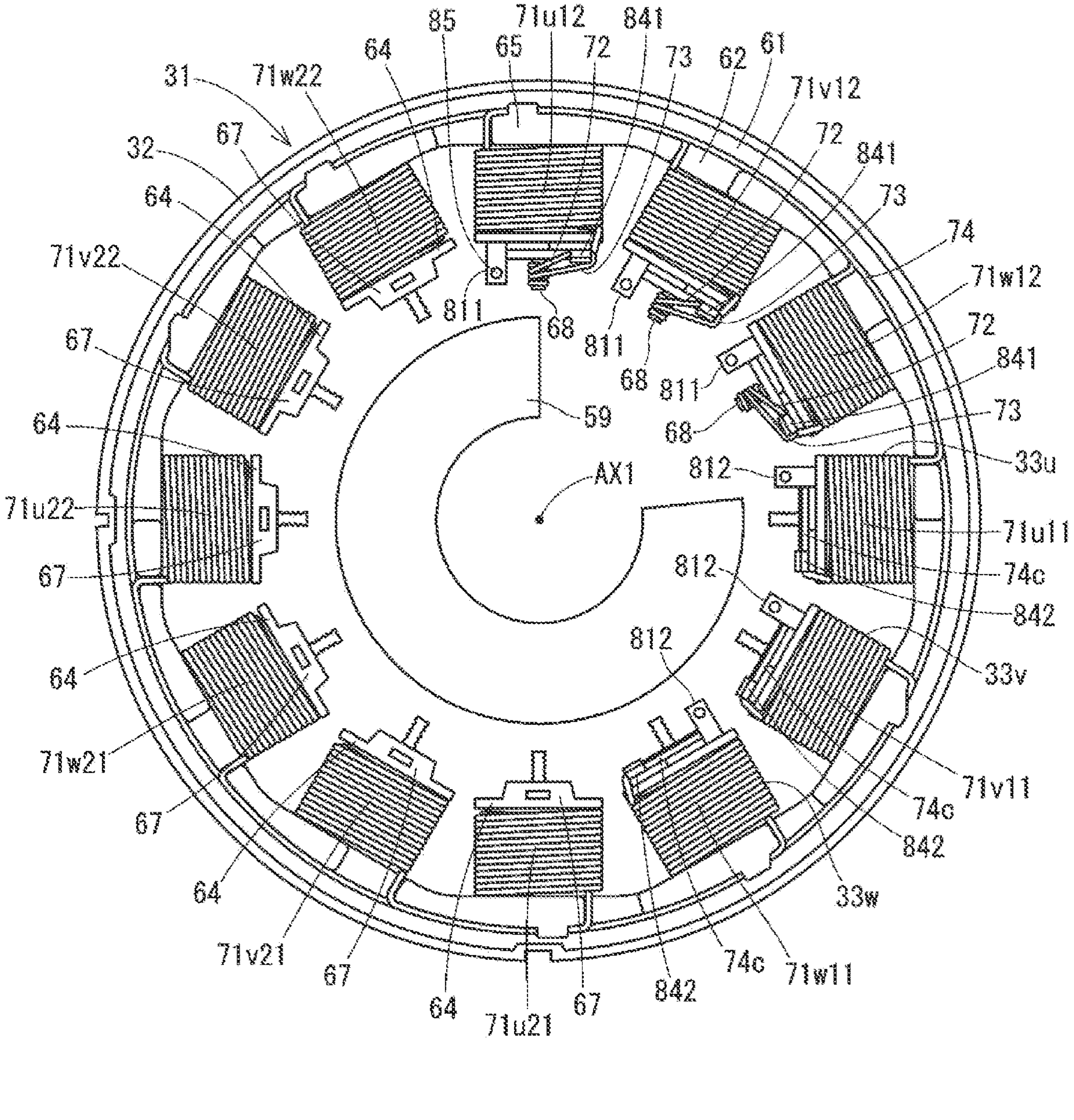
FIG. 3 is a view of a stator and a control board of FIG. 2 as viewed from a direction of arrow III.

As shown in FIGS. 2 and 3, the stator 31 includes a stator core 32, a plurality of windings 33, an insulator 61 interposed between the stator core 32 and the windings 33, and a plurality of coil terminals 81 connected to the windings 33.

The stator core 32 is composed of a plurality of metal plates laminated in the axial direction. The stator core 32 has an annular yoke 55 fixed to an inner wall of the tubular portion 25 of the front housing 21, and a plurality of teeth 56 formed so as to project radially inward from the yoke 55.

Figure 4:
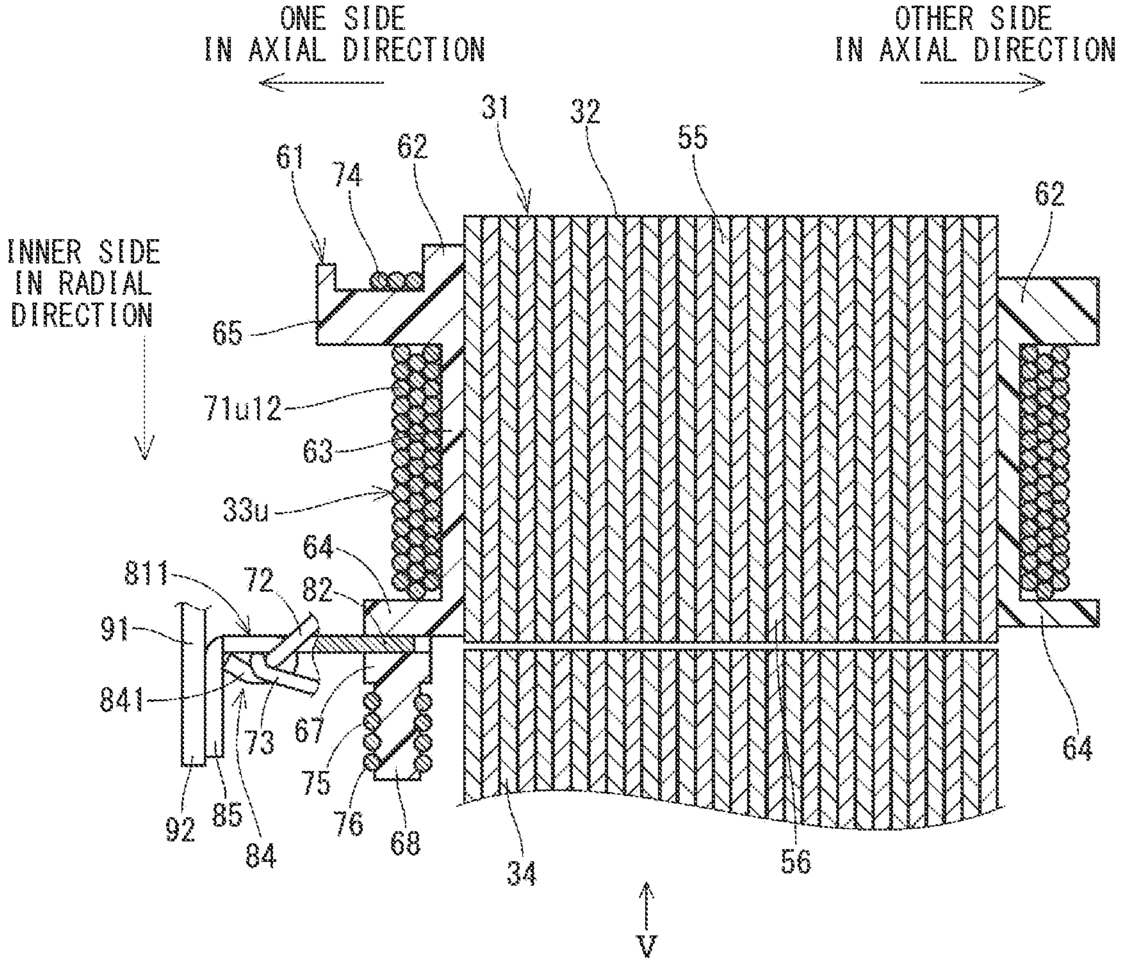
FIG. 4 is an enlarged view of a main part of the stator of FIG. 2.
Figure 5:
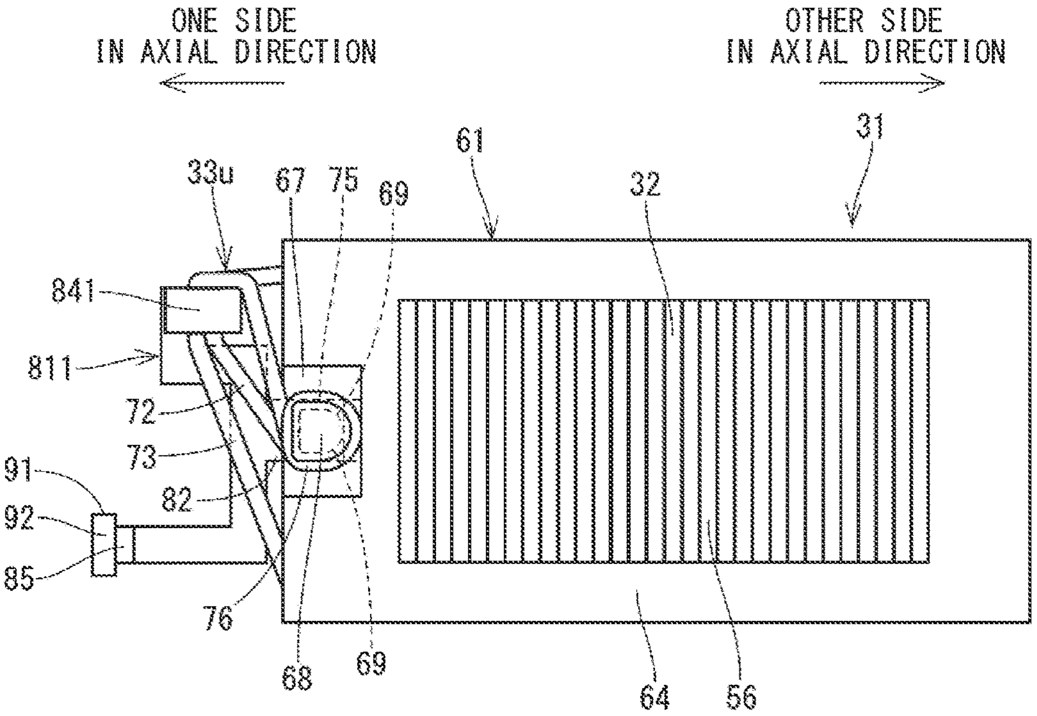
FIG. 5 is a view of the stator of FIG. 4 as viewed from a direction of arrow V.

As shown in FIGS. 3 to 5, the insulator 61 includes a yoke insulating portion 62 provided on both axial ends of the yoke 55 and an inner wall of the yoke 55 on the inner side in the radial direction, a tooth insulating portion 63 provided on a portion around the teeth 56 (that is, other than a tip surface of the teeth 56), and a flange portion 64 provided so as to protrude in the axial direction and the circumferential direction from the tooth tip side of the tooth insulating portion 63. The insulator 61 is assembled to the stator core 32.

Figure 6:
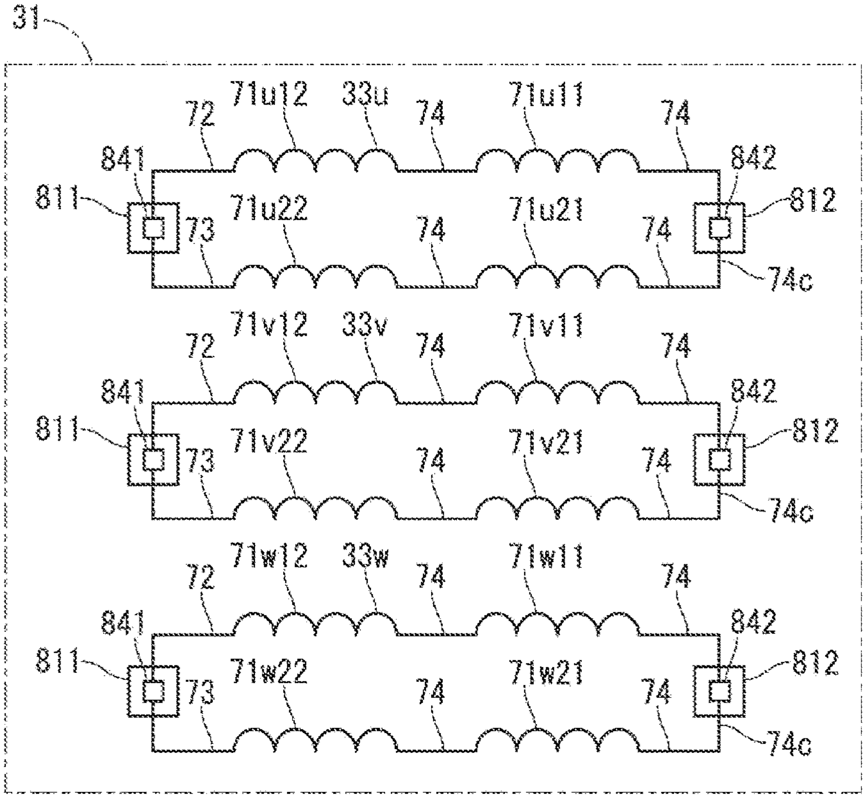
FIG. 6 is a diagram schematically showing windings and coil terminals of FIG. 3.
Figure 7:
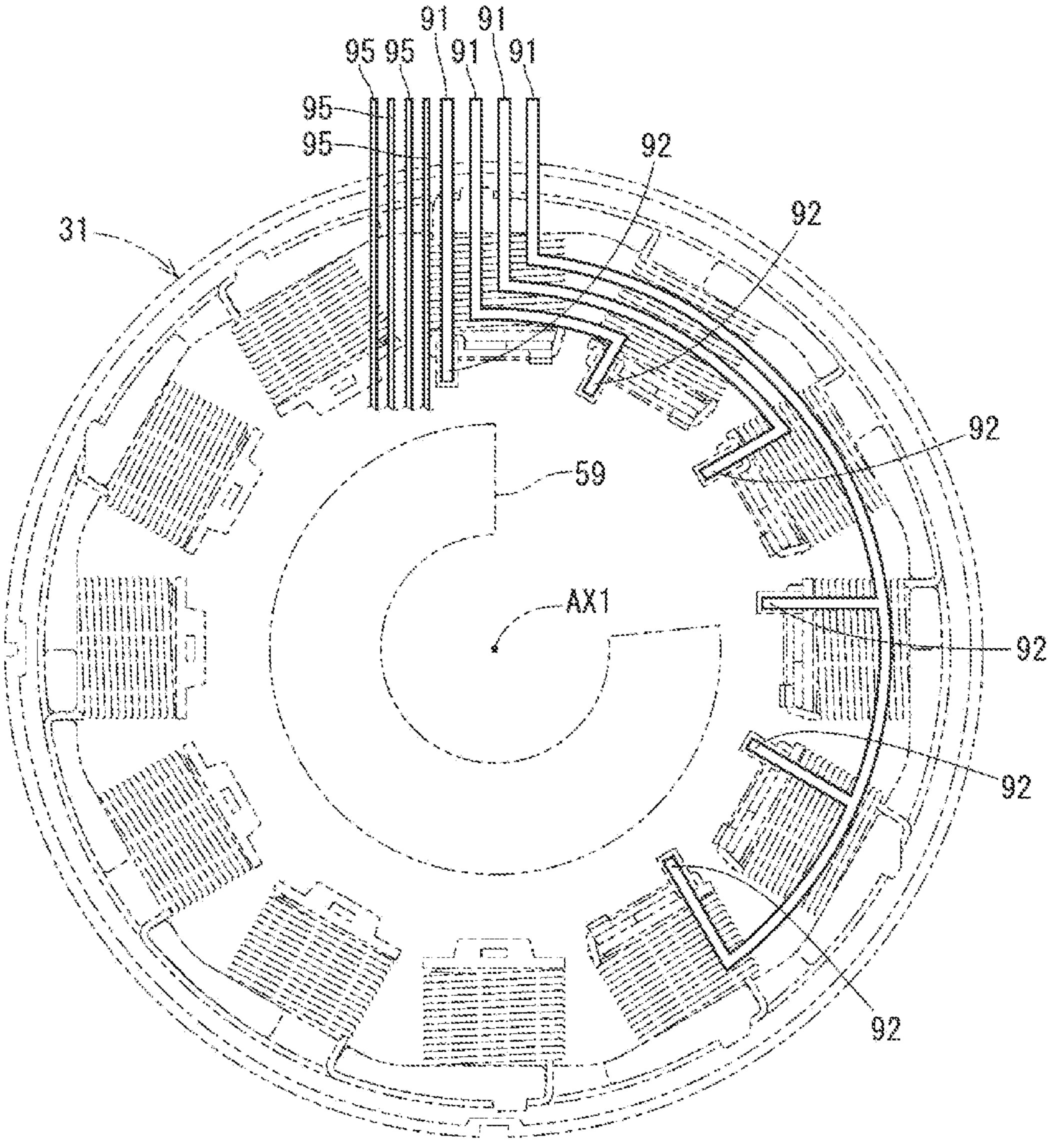
FIG. 7 is a view of the stator, a motor terminal, and a sensor terminal of FIG. 2 as viewed from a direction of arrow VII.
Figure 8:
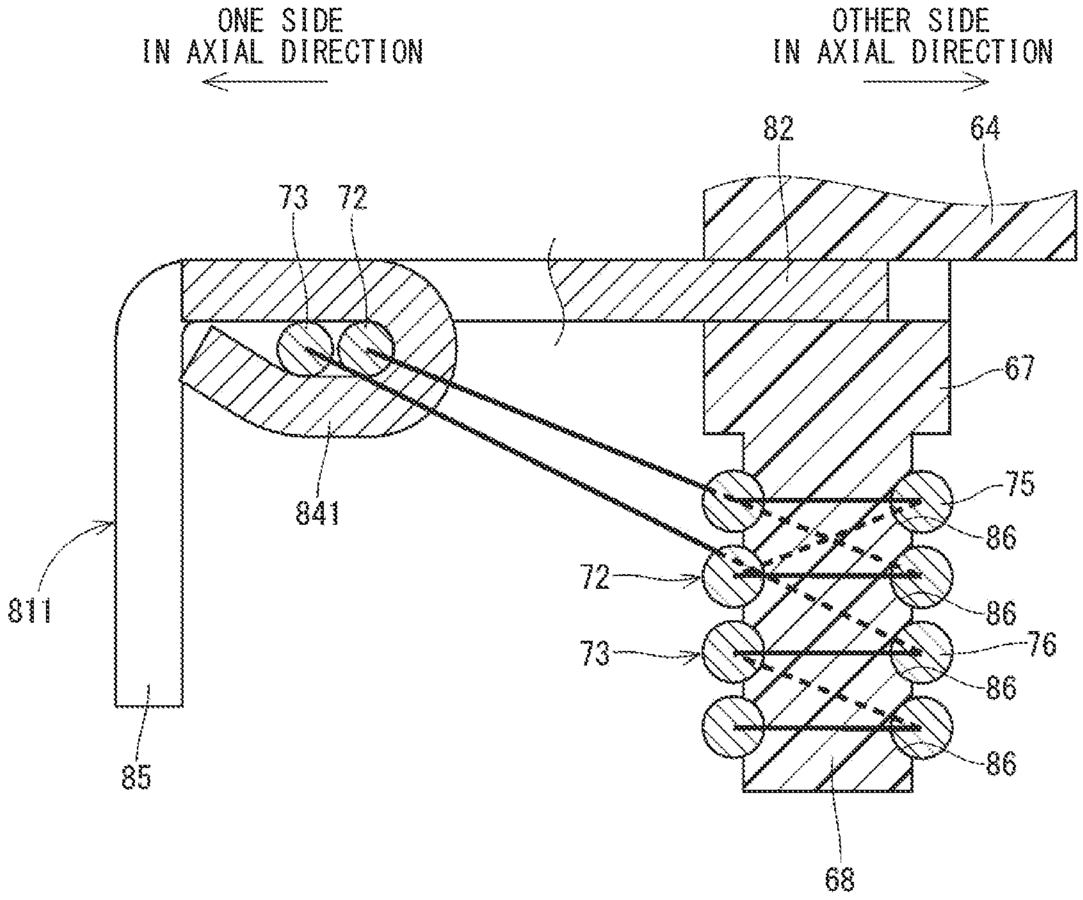
FIG. 8 is a cross-sectional view of a winding holding portion and a winding portion of FIG. 4.
Figure 9:
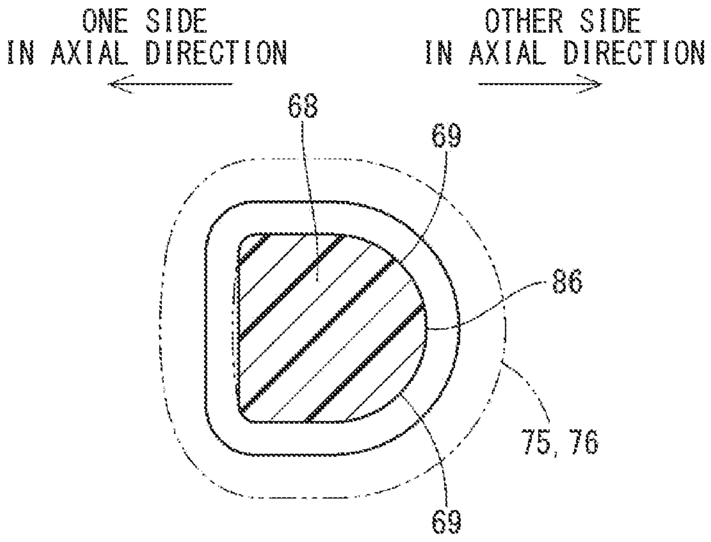
FIG. 9 is a cross-sectional view of the winding holding portion of FIG. 5.

As shown in FIGS. 3 and 6, the plurality of windings 33 include a U-phase winding 33*u*, a V-phase winding 33*v*, and a W-phase winding 33*w*. Hereinafter, when each winding is not distinguished, it is simply described as "winding 33".

The winding 33 has a coil 71 wound around the teeth 56, that is, around the tooth insulating portion 63 of the insulator 61. One winding 33 is composed of one electric wire, and has four coils 71 between the first end portion 72 and the second end portion 73 thereof. A crossover line 74 is provided between the coils 71. Since one coil 71 is provided in one tooth 56, one winding 33 is provided over four teeth 56. The first end portion 72 of the winding 33 is referred to as a first end portion 72, and the second end portion 73 of the winding 33 is referred to as a second end portion 73.

The U-phase winding 33*u* has coils 71*u*11, 71*u*12, 71*u*21 and 71*u*22. The V-phase winding 33*v* has coils 71*v*11, 71*v*12, 71*v*21, 71*v*22. The W-phase winding 33*w* has coils 71*w*11, 71*w*12, 71*w*21, and 71*w*22. In the U-phase winding 33*u*, the coils 71*u*11 and 71*u*12, which are a first coil groups from the first end portion 72 to the intermediate part 74*c*, and the coils 71*u*21, 71*u*22, which are a second coil groups from the intermediate part 74*c* to the second end portion 73, are arranged in parallel. Similarly, in the V-phase winding 33*v* and the W-phase winding 33*w*, the first coil group and the second coil group are arranged in parallel. In the first embodiment, twelve teeth 56 are provided, and one coil 71 is provided for each tooth 56. One winding 33 is the coil 71 for one phase.

As shown in FIGS. 2 to 4, the yoke insulating portion 62 has a protruding locking portion 65 protruding toward a bottom portion 26 side of the front housing 21. The locking portion 65 locks the crossover line 74. In the first embodiment, the locking portion 65 is integrally provided with the insulator 61. In the present specification, "providing integrally" or "having integrally" means that two related parts are composed of the same member.

As shown in FIGS. 2 and 3, the actuator 10 includes a magnet 57 provided on the rotor core 38, a magnetic sensor 58 that is an element for detecting the rotation position of the rotor 34 and detects the magnetism of the magnet 57, and a control board 59 on which the magnetic sensor 58 is mounted.

As shown in FIG. 2, the front housing 21 has the bottom portion 26, a tubular portion 25, and a connector portion 27 that form a resin main body portion. The connector portion 27 is formed on the outside of the tubular portion 25. An external connector 17 is detachably connected to the connector portion 27. The external connector 17 holds a power supply terminal 18 and a signal terminal 19.

As shown in FIGS. 2, 4, 5, and 7, the front housing 21 includes a plurality of motor terminals 91 that is connected to the coil terminal 81 and is as external connection terminals directly connectable to the external power supply terminal 18, and a plurality of sensor terminals 95 that are connected to the control board 59 and can be connected to the external signal terminal 19. The motor terminal 91 and the sensor terminal 95 are inserted into the main body of the front housing 21, and extend from the bottom portion 26 to the connector portion 27 through the tubular portion 25. In the first embodiment, the motor terminal 91 and the sensor terminal 95 are inserted into the front housing 21 while being held by a primary molded body 99.

As shown in FIGS. 2 to 5, on the bottom portion 26 side of the front housing 21 of the flange portions 64, a terminal holding portion 67 for holding the coil terminal 81 and a winding holding portion 68 for holding the first end portion 72 and the second end portion 73 of the winding 33 are provided. The terminal holding portion 67 has a hole into which the coil terminal 81 can be inserted. The winding holding portion 68 is a protrusion protruding from the bottom portion 26 side of the flange portion 64. In the first embodiment, the terminal holding portion 67 and the winding holding portion 68 are integrally provided on the insulator 61.

The coil terminal 81 includes a held portion 82 held by the terminal holding portion 67, a winding connection portion 84 electrically connected to the winding 33, and a contact portion 85 contacting and electrically connecting to the motor terminal 91.

As shown in FIGS. 3 to 6, the plurality of coil terminals 81 include a first coil terminal 811 having a first winding connection portion 841 connected to the first end portion 72 and the second end portion 73, and a second coil terminal 812 having a second winding connection portion 842 connected to the intermediate part 74*c* between the two coils 71 included in one winding 33. In the first embodiment, the shape of the first coil terminal 811 and the shape of the second coil terminal 812 are the same. Hereinafter, when each coil terminal is not distinguished, it is simply described as "coil terminal 81". Moreover, when each winding connection portion is not distinguished, it is simply described as "winding connection portion 84".

One coil terminal 81 is provided for each of the six teeth 56. Of the six coil terminals 81, three first coil terminals 811 are connected to the first end portion 72 and the second end portion 73, and the remaining three second coil terminals 812 are connected to the intermediate part 74*c*. The first end portion 72 and the second end portion 73 included in one winding 33 are connected to the same first winding connection portion 841.

The coil terminals 81 are provided at the ends of the winding 33 and the intermediate part 74*c*, respectively, and two coil terminals 81 are provided for each phase of the winding. The first end portion 72, which is a winding start portion of the winding 33, extends from the winding holding portion 68 to the teeth 56 through the first winding connection portion 841. The second end portion 73, which is a winding end portion of the winding 33, extends from the teeth 56 to the winding holding portion 68 through the first winding connection portion 841.

As shown in FIGS. 4, 5, 8, and 9, the first end portion 72 has a first winding portion 75 that is wound on the winding holding portion 68 one or more times, and held thereon. The winding holding portion 68 is a protrusion that protrudes radially inward from one axial side of the flange portion 64. The winding holding portion 68 has a plurality of engaging grooves 86 formed so as to line up in a predetermined direction (that is, the radial direction, which is the protruding direction of the winding holding portion 68). In the first embodiment, the engaging groove 86 is formed over the entire winding direction. The plurality of engaging grooves 86 are connected to each other to form a spiral. The first winding portion 75 is wound in alignment so as to engage with the engaging groove 86. The second end portion 73 has a second winding portion 76 that is wound on the winding holding portion 68 one or more times, and held thereon. The second winding portion 76 is arranged side by side with the first winding portion 75 and is wound in alignment so as to engage with the engaging groove 86. The first winding portion 75 and the second winding portion 76 included in one winding 33 are wound on the same winding holding portion 68 and held thereon.

The winding holding portion 68 is arranged so as to line up on one side in the axial direction with respect to the rotor 34. In a cross section orthogonal to the radial direction of the winding holding portion 68, a corner portion on the other side in the axial direction is defined as a rotor side corner portion 69. The radius of curvature of the rotor side corner portion 69 is larger than the wire diameter of the winding 33.

The teeth 56 are formed to protrude radially inward from yoke 55. The winding holding portion 68 is formed so as to protrude radially inward like the teeth 56. The winding connection portion 84 is positioned on one side in the axial direction with respect to the winding holding portion 68 and is also positioned on one side in the axial direction with respect to the tooth insulating portion 63. Further, the winding connection portion 84 is positioned between the winding holding portion 68 and the winding 33 in the radial direction.

As shown in FIGS. 2 to 5, the motor terminal 91 has a contacted portion 92 that extends in a direction perpendicular to the axial direction and abuts against the contact portion 85 of the coil terminal 81 in the axial direction. The coil terminal 81 is directly connected to the motor terminal 91 without a connecting part such as a bus bar. In the first embodiment, the contact portion 85 and the contacted portion 92 are welded together. Hereinafter, the connecting portion between the contact portion 85 and the contacted portion 92 is referred to as a "welded portion".

The winding holding portion 68 and the winding connection portion 84 are arranged radially inward of the coil 71, and the welded portion is arranged radially inward of the tips of the teeth of the stator core 32. Specifically, the winding holding portion 68 and the winding connection portion 84 are formed on the bottom portion 26 side in the axial direction with respect to the held portion 82. The contact portion 85 is formed to extend radially inward from the tip of the winding holding portion 68. In the first embodiment, the winding holding portion 68 and the winding connection portion 84 are branched from the held portion 82 respectively.

The winding 33 is manufactured by nozzle winding. Specifically, after the electric wire is wound around the winding holding portion 68 of the first coil terminal 811, and passed through the first winding connection portion 841, the electric wire is wound around the first tooth insulating portion 63. Subsequently, the electric wire pulled out from the first tooth insulating portion 63 is engaged with the locking portion 65, and then wound around the second tooth insulating portion 63. Subsequently, after the electric wire pulled out from the second tooth insulating portion 63 is passed through the second winding connection portion 842 of the second coil terminal 812, and is engaged with the locking portion 65, the electric wire is wound around the third tooth insulating portion 63. Subsequently, after the electric wire pulled out from the third tooth insulating portion 63 is engaged with the locking portion 65, the electric wire is wound around the fourth tooth insulating portion 63. Finally, after the electric wire pulled out from the fourth tooth insulating portion 63 is passed through the first winding connection portion 841, the electric wire is wound next to the first winding portion 75 in the first winding holding portion 681. The first winding connection portion 841 and the first end portion 72 and the second end portion 73 are connected by fusing or the like, for example. The second winding connection portion 842 and the intermediate part 74*c* are similarly connected by, for example, fusing.

As described above, the winding work of the electric wire is performed across a plurality of slots. When using the locking portion 65 arranged on the outer peripheral portion of the stator 31 and the winding holding portion 68 and the winding connection portion 84 arranged on the inner peripheral portion, complete alignment winding is realized by setting the number of winding layers of the wire to the tooth insulating portion 63 to be an odd number. The first and third layers of the winding 33 are wound from the radially inner side to the outer side, and the second layer of the winding 33 is wound from the radially outer side to the inner side.

Effects

As described above, in the first embodiment, the stator 31 includes the stator core 32 having a plurality of teeth 56, a plurality of windings 33 having coils 71 wound around the teeth 56, a winding holding portion 68 for holding a part of the winding 33, and a plurality of coil terminals 81 having a winding connection portion 84 connected to the windings 33. The first end portion 72 and the second end portion 73 are wound around the same winding holding portion 68 and held thereon. The winding 33 has four coils 71 between the first end portion 72 and the second end portion 73.

As a result, one winding 33 is provided over two or more teeth 56, so there is no need to provide two coil terminals for each tooth as in the conventional art. Therefore, the number of coil terminals 81 and the number of terminal treatments of windings 33 are reduced. Therefore, the number of parts and the manufacturing man-hours can be reduced. In addition, since the first end portion 72 and the second end portion 73 are wound around the same winding holding portion 68 and held thereon, the number of the winding holding portions 68 can be reduced, compared to the configuration in which the second end portion 73 is wound around a place different from the first end portion 72.

Further, in the first embodiment, the insulator 61 integrally has the winding holding portion 68. The winding holding portion 68 has a plurality of engaging grooves 86 formed so as to line up in a predetermined direction. The first winding portion 75 and the second winding portion 76 are wound in alignment so as to engage with the engaging groove 86. It is possible to prevent the ends of the windings 33 from becoming unwound.

Further, in the first embodiment, the second winding portion 76 and the first winding portion 75 are aligned and wound side by side. As a result, the first end portion 72 and the second end portion 73 of the winding 33 are wound around the same part, and an increase in size in the winding expansion direction is suppressed, thereby avoiding interference with peripheral members in the axial direction. Therefore, the axial size of the stator 31 can be reduced.

As shown in FIGS. 3 to 5, the insulator 61 includes a yoke insulating portion 62 provided on both axial ends of the yoke 55 and an inner wall of the yoke 55 on the inner side in the radial direction, a tooth insulating portion 63 provided on a portion around the teeth 56, and a flange portion 64 provided so as to protrude in the axial direction and the circumferential direction from the tooth tip side of the tooth insulating portion 63. The winding holding portion 68 is formed to protrude radially inward from one axial side of the flange portion 64. The curvature radius of the rotor side corner portion 69, which is the corner portion on the other side in the axial direction of the winding holding portion 68, is larger than the wire diameter of the winding 33. Accordingly, it is possible to prevent the portion of the first end portion 72 and the second end portion 73 wound around the winding holding portion 68, which is positioned on the other side in the axial direction, that is, on the rotor 34 side, from expanding toward the rotor 34 side. Therefore, it is possible to prevent the first end portion 72 and the second end portion 73 from interfering with the rotor 34, which is a peripheral member in the axial direction.

Further, in the first embodiment, the first winding connection portion 841 and the second winding connection portion 842 are arranged radially inward of the coil 71. Therefore, by using the winding connection portions 841 and 842 located in the inner peripheral portion of the stator 31, the nozzle winding for continuously winding the winding 33 on two or more teeth 56 from the winding start to the winding end can be implemented. Therefore, it is possible to prevent the coil terminals 811 and 812 from protruding radially outward while adopting a nozzle winding that can be manufactured at low cost. Therefore, an inexpensive and compact stator 31 can be obtained.

In the first embodiment, the plurality of coil terminals 81 include a first coil terminal 811 having a first winding connection portion 841 connected to the first end portion 72 and the second end portion 73, and a second coil terminal 812 having a second winding connection portion 842 connected to the intermediate part 74*c* between the two coils 71 included in one winding 33.

As a result, between the first coil terminal 811 and the second coil terminal 812, the coil 71 from the first end portion 72 to the intermediate part 74*c* of the one winding 33 and the coil 71 from the intermediate part 74*c* to the second end portion 73 are arranged in parallel. Therefore, as in the case of winding the windings in series, the nozzle winding is performed in which the windings 33 are continuously wound on two or more teeth 56 from the start to the end of the winding, and the winding 33 is passed through the second coil terminal 812 so as to construct a parallel circuit. Moreover, compared to the conventional form in which coil terminals are provided at both ends of two windings wound in series, the two coil terminals can be replaced with one second coil terminal 812, and the number of terminal processing of the winding 33 can be reduced. Therefore, the number of parts and the manufacturing man-hours can be reduced.

Further, in the first embodiment, the first end portion 72 extends from the winding holding portion 68 through the winding connecting portion 84 to the teeth 56. The second end portion 73 extends from the teeth 56 to the winding holding portion 68 through the winding connecting portion 84. Therefore, by passing the electric wire through the winding connection portion 84 in the winding process of the winding 33, in the process of connecting the winding connection portion 84 and the winding 33, the winding 33 need not be manipulated, and only crimping needs to be performed, so that the connection process can be simplified.

Further, in the first embodiment, the teeth 56 are formed to protrude radially inward from the yoke 55. The winding holding portion 68 is formed so as to protrude radially inward like the teeth 56. Therefore, in the winding process of the winding 33, after the electric wire is wound around the winding holding portion 68, it is possible to smoothly transition to winding on the teeth insulating portion 63 without changing the winding direction. Also, after the electric wire is wound around the fourth tooth insulating portion 63, the electric wire can be smoothly transferred to winding on the winding holding portion 68.

Further, in the first embodiment, the winding connection portion 84 is positioned on one side in the axial direction with respect to the winding holding portion 68 and is also positioned on one side in the axial direction with respect to the tooth insulating portion 63. Further, the winding connection portion 84 is positioned between the winding holding portion 68 and the winding 33 in the radial direction. Therefore, in the winding process of the winding 33, when the electric wire is wound around the winding holding portion 68 and then wound around the tooth insulating portion 63, the electric wire can be smoothly hooked to the winding connection portion 84 without changing the winding direction.

Further, in the first embodiment, the first end portion 72 and the second end portion 73 included in one winding 33 are connected to the same first winding connection portion 841. The first winding portion 75 and the second winding portion 76 included in one winding 33 are held on the same winding holding portion 68. As a result, two coil terminals can be replaced with one first coil terminal 811 not only on the intermediate part 74*c* side but also on the end portion side, and the number of terminal processes of the winding 33 can be reduced. Therefore, the number of parts and manufacturing man hours can be further reduced.

Second Embodiment

Figure 10:
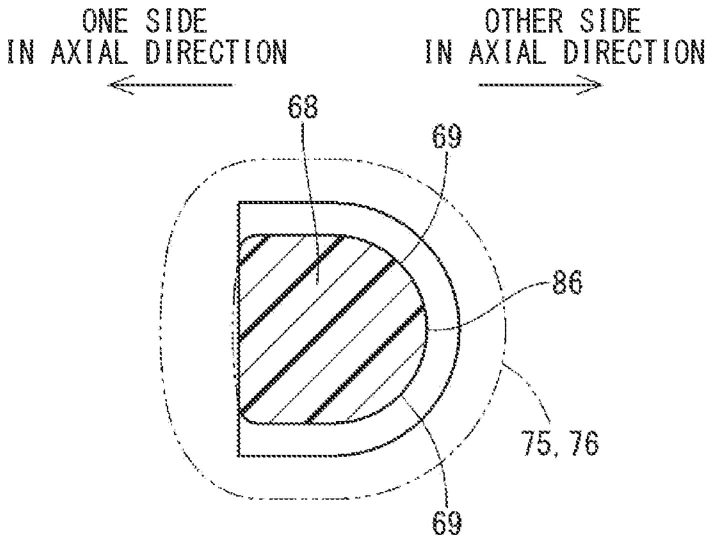
FIG. 10 is a cross-sectional view of a winding holding portion in the stator of a second embodiment, which corresponds to FIG. 9 of the first embodiment.

In a second embodiment, as shown in FIG. 10, the engaging groove 86 of the winding holding portion 68 are formed on the other side of the winding holding portion 68 in the axial direction and on both sides of the winding holding portion 68 in the circumferential direction. Thus, the engaging groove 86 may be formed partially in the winding direction. Even so, the first winding portion 75 and the second winding portion 76 can be neatly wound in alignment, and the deviation of the first winding portion 75 and the second winding portion 76 can be suppressed.

Third Embodiment

Figure 11:
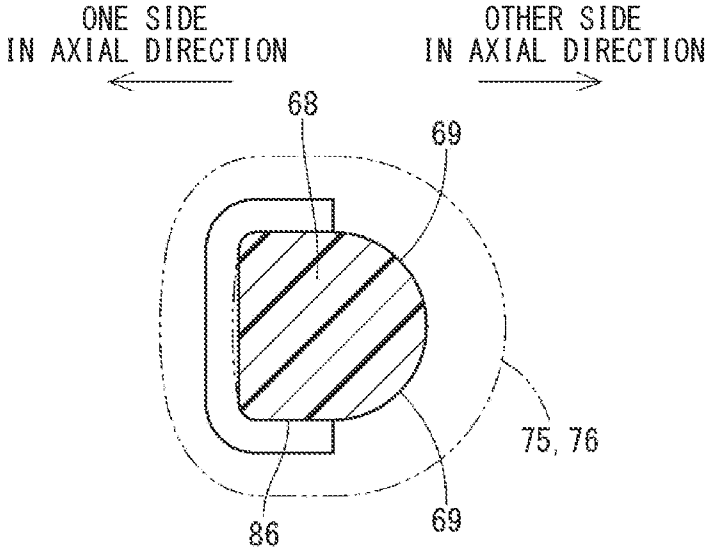
FIG. 11 is a cross-sectional view of a winding holding portion in the stator of a third embodiment, which corresponds to FIG. 9 of the first embodiment.

In a third embodiment, as shown in FIG. 11, the engaging groove 86 of the winding holding portion 68 are formed on the one side of the winding holding portion 68 in the axial direction and on both sides of the winding holding portion 68 in the circumferential direction. Thus, the engaging groove 86 may be formed partially in the winding direction. In the third embodiment, effects similar to those of the second embodiment can be obtained.

Fourth Embodiment

Figure 12:
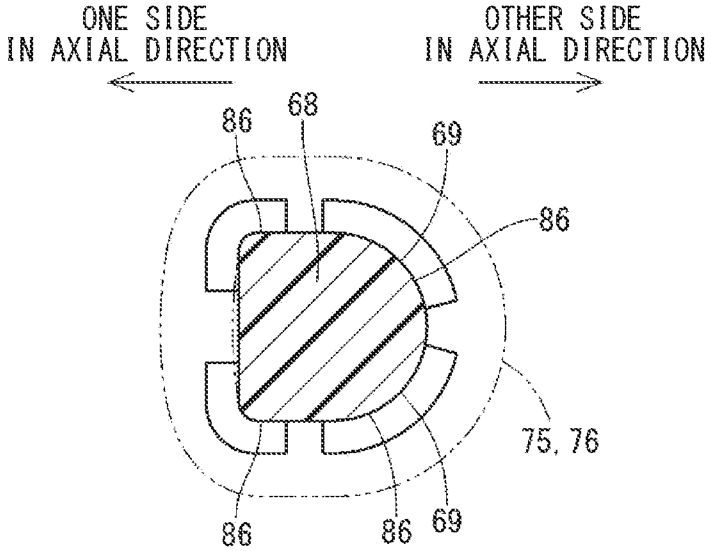
FIG. 12 is a cross-sectional view of a winding holding portion in the stator of a fourth embodiment, which corresponds to FIG. 9 of the first embodiment.

In a fourth embodiment, as shown in FIG. 12, the engaging grooves 86 of the winding holding portion 68 are formed at the corners of the winding holding portion 68. Thus, the engaging groove 86 may be formed partially in the winding direction. By providing the engaging grooves 86 at the corners of the winding holding portion 68 where the first winding portion 75 and the second winding portion 76 tend to shift, the displacement of the first winding portion 75 and the second winding portion 76 can be effectively suppressed.

Fifth Embodiment

Figure 13:
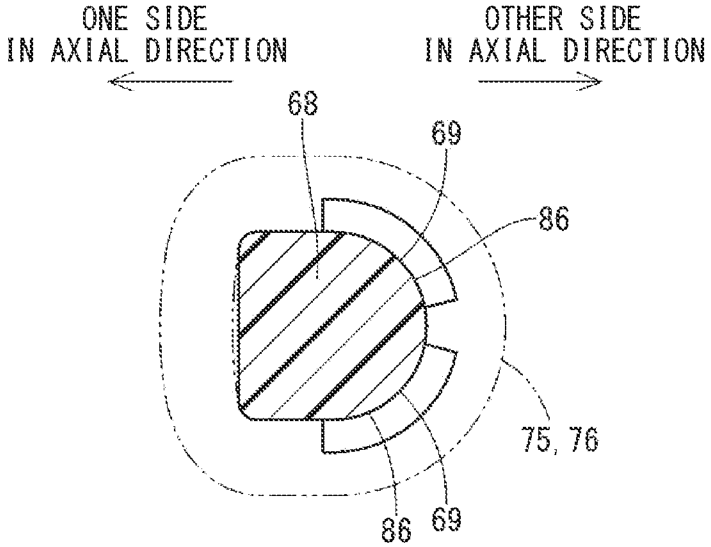
FIG. 13 is a cross-sectional view of a winding holding portion in the stator of a fifth embodiment, which corresponds to FIG. 9 of the first embodiment.

In a fifth embodiment, as shown in FIG. 13, the engaging grooves 86 of the winding holding portion 68 is formed at the corner portions of the winding holding portion 68 on the other side in the axial direction. In this manner, the engaging grooves 86 may be formed in some of the multiple corners of the winding holding portion 68. Although the engaging grooves 86 are provided at the corners of the winding holding portion 68 where the first winding portion 75 and the second winding portion 76 tend to shift, molding can be facilitated by limiting the number of engaging grooves 86.

Sixth Embodiment

Figure 14:
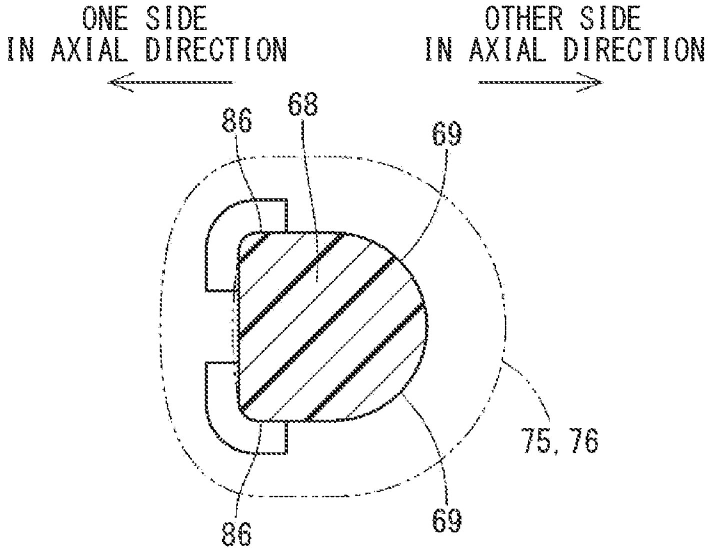
FIG. 14 is a cross-sectional view of a winding holding portion in the stator of a sixth embodiment, which corresponds to FIG. 9 of the first embodiment.

In a sixth embodiment, as shown in FIG. 14, the engaging grooves 86 of the winding holding portion 68 is formed at the corner portions of the winding holding portion 68 on the one side in the axial direction. In this manner, the engaging grooves 86 may be formed in some of the multiple corners of the winding holding portion 68. In the sixth embodiment, effects similar to those of the fifth embodiment can be obtained.

Seventh Embodiment

Figure 15:
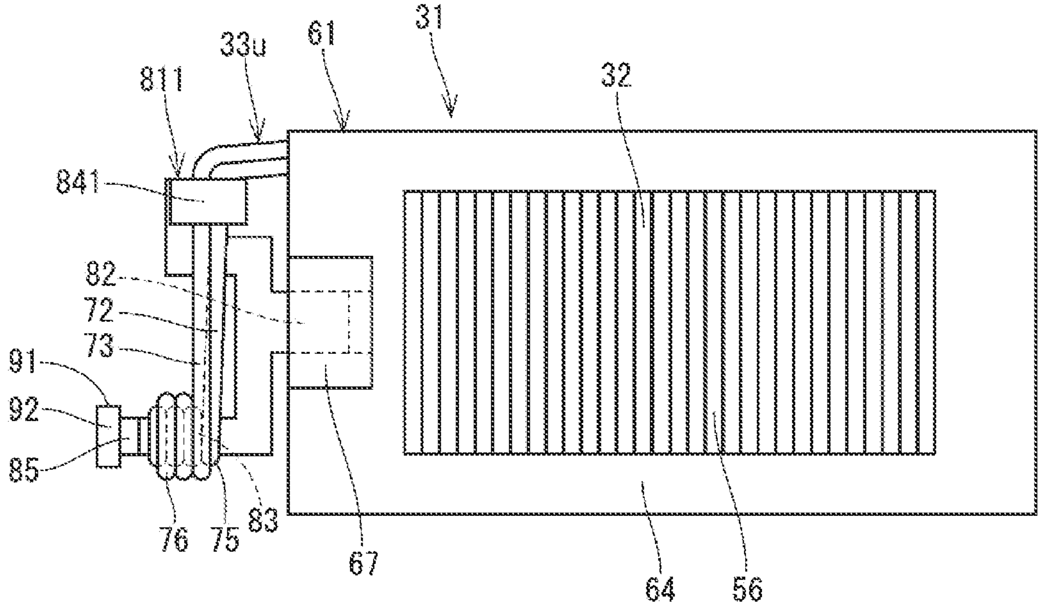
FIG. 15 is a diagram showing a main part of the stator of a seventh embodiment, and is a diagram corresponding to FIG. 5 of the first embodiment.
Figure 16:
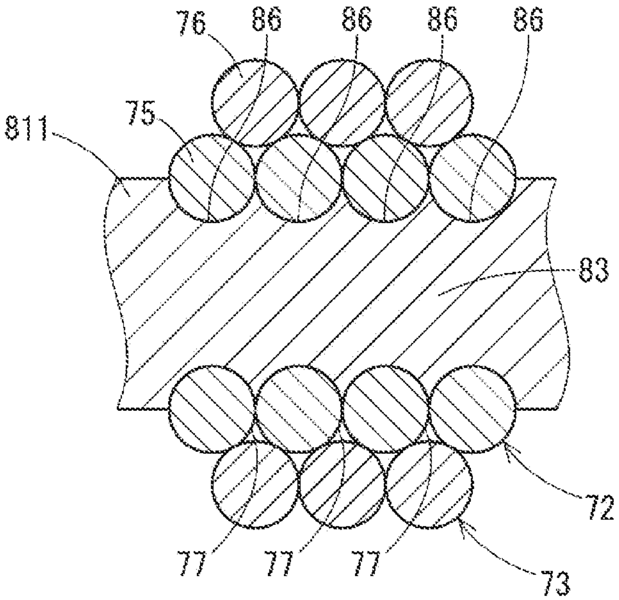
FIG. 16 is a cross-sectional view of the winding holding portion and winding portion of FIG. 15.

In a seventh embodiment, as shown in FIGS. 15 and 16, the coil terminal 81 has a winding holding portion 83 that holds the first end portion 72 and the second end portion 73 of the winding 33. In the seventh embodiment, the winding holding portion 83 is provided integrally with the coil terminal 81.

The first winding portion 75 is wound in alignment so as to engage with the engaging groove 86. The second winding portion 76 is wound so as to overlap the first winding portion 75. The second winding portion 76 is wound in alignment so as to engage with recesses 77 formed between the lines of the first winding portion 75. The first winding portion 75 and the second winding portion 76 included in one winding 33 are held on the same winding holding portion 83.

When the winding 33 is manufactured by nozzle winding, after the electric wire pulled out from the fourth tooth insulating portion 63 is passed through the first winding connection portion 841, the electric wire is wound so as to overlap the first winding portion 75 on the winding holding portion 83.

In the seventh embodiment, the first end portion 72 has a first winding portion 75 wound around the winding holding portion 83. The second end portion 73 has a second winding portion 76 wound so as to overlap the first winding portion 75. Since the second end portion 73 is wound on the first end portion 72 in this manner, it is possible to prevent the ends of the winding 33 becoming unwound.

Further, the second winding portion 76 is wound in alignment so as to engage with recesses 77 formed between the lines of the first winding portion 75. It is possible to prevent the ends of the windings 33 from becoming unwound.

Eighth Embodiment

Figure 17:
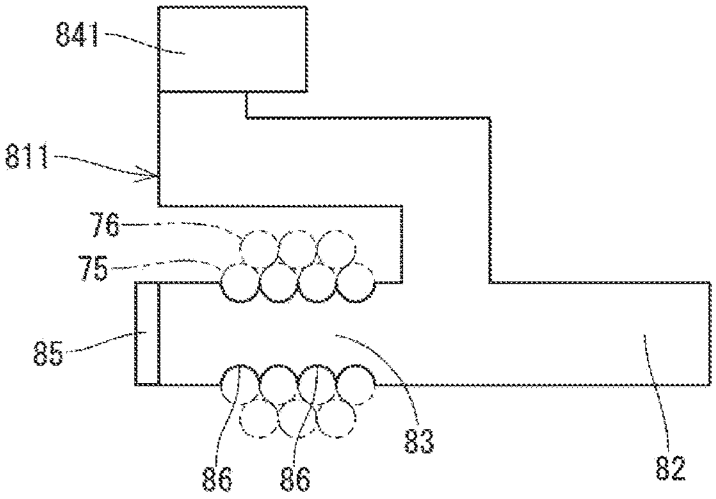
FIG. 17 is a diagram showing a coil terminal in the stator of an eighth embodiment, and is a diagram corresponding to FIG. 16 of the seventh embodiment.

In an eighth embodiment, as shown in FIG. 17, the winding holding portion 83 may be formed at a location extending straight from the held portion 82 in the axial direction.

Ninth Embodiment

Figure 18:
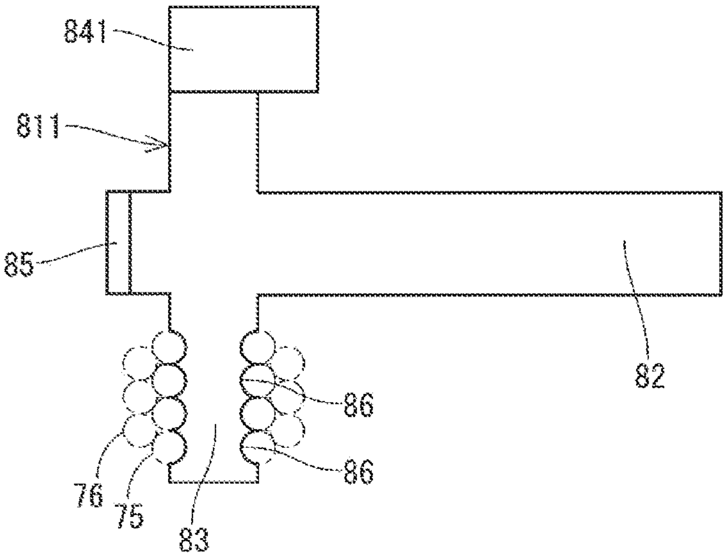
FIG. 18 is a diagram showing a coil terminal in the stator of a ninth embodiment, and is a diagram corresponding to FIG. 16 of the seventh embodiment.

In the ninth embodiment, the winding holding portion 83 is formed to extend in the circumferential direction as shown in FIG. 18, and the alignment direction of the first winding portion 75 and the second winding portion 76 may coincide with the circumferential direction.

Tenth Embodiment

Figure 19:
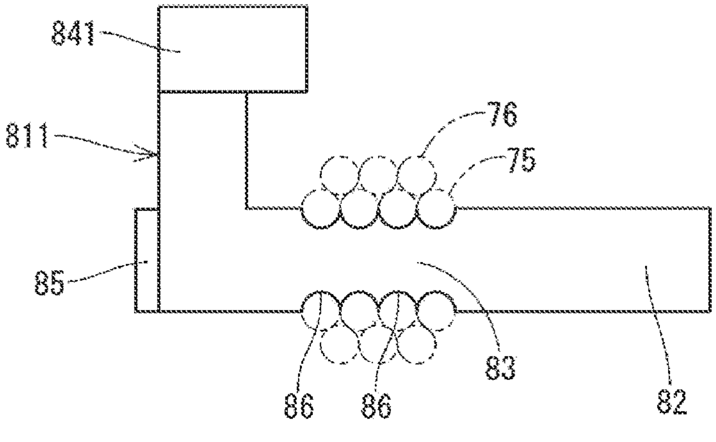
FIG. 19 is a diagram showing a coil terminal in the stator of a tenth embodiment, and is a diagram corresponding to FIG. 16 of the seventh embodiment.

In a tenth embodiment, as shown in FIG. 19, the winding holding portion 83 is formed between the held portion 82 and the winding connection portion 841 and the winding holding portion 83 may be formed at a portion extending straight in the axial direction from the held portion 82.

Eleventh Embodiment

Figure 20:
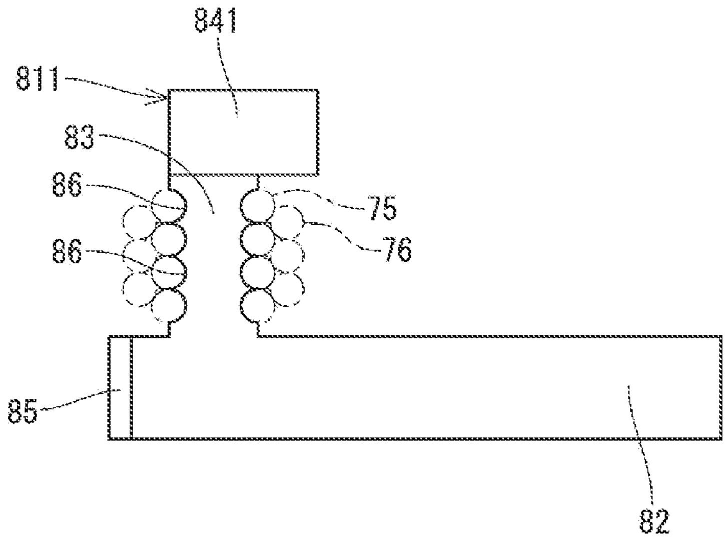
FIG. 20 is a diagram showing a coil terminal in the stator of an eleventh embodiment, and is a diagram corresponding to FIG. 16 of the seventh embodiment.

In an eleventh embodiment, as shown in FIG. 20, the winding holding portion 83 is formed in the middle from the held portion 82 to the winding connection portion 84 and the winding holding portion 83 may be formed in a portion extending in the circumferential direction.

Twelfth Embodiment

Figure 21:
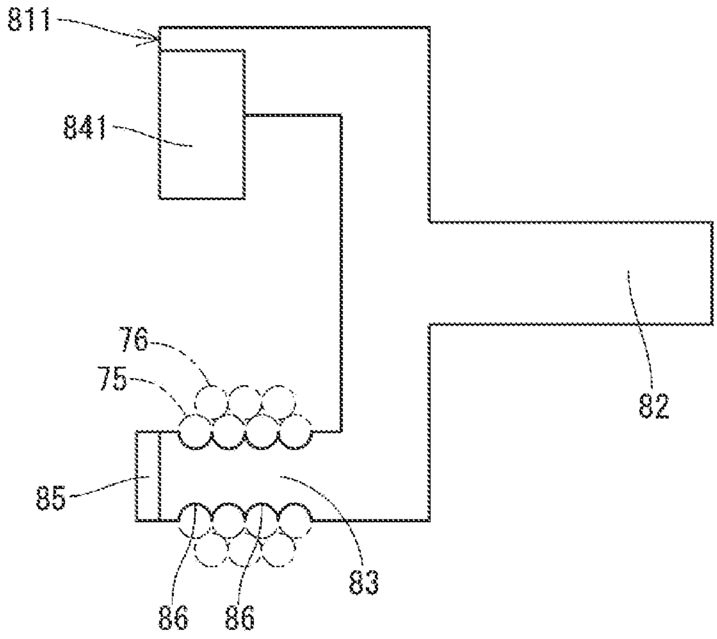
FIG. 21 is a diagram showing a coil terminal in the stator of a twelfth embodiment, and is a diagram corresponding to FIG. 16 of the seventh embodiment.

In a twelfth embodiment, as shown in FIG. 21, the direction in which the winding 33 passes through the winding connection portion 841 is not limited to the circumferential direction, and may be other directions such as the axial direction.

OTHER EMBODIMENTS

In other embodiments, the winding holding portion may not have engaging grooves.

In other embodiments, the shape of the first coil terminal and the shape of the second coil terminal may be different. For example, the shape of the first winding connection portion and the shape of the second winding connection portion may be different. Also, the second coil terminal may not be provided with the winding holding portion.

In other embodiments, the winding holding portion is not limited to a part of the coil terminal or insulator, and may be a part of other members. Moreover, the extending direction of the winding holding portion is not limited to the axial direction, and may be the radial direction, the circumferential direction, or any other direction.

In other embodiments, there may be three or fewer coils or five or more coils between one end of the winding and the other end of the winding. In short, the winding should just have two or more coils from one end of the winding to the other end thereof.

In other embodiments, the joining of the coil terminal and the motor terminal is not limited to welding, and may be performed by other methods such as pressure welding or soldering. In other embodiments, the connector portion of the front housing may be split into two or more.

In other embodiments, the number of teeth is not limited to 12 and may be other numbers. In other embodiments, the number of winding phases is not limited to three, and may be any other number. In other embodiments, the stator may be applied not only to motor but also to generator.

The present disclosure is not limited to the embodiments described above, and various modifications are possible within the scope of the present disclosure without departing from the spirit of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A stator of a rotary electric machine, comprising:

a stator core having a plurality of teeth;

a plurality of windings having coils wound around the teeth;

a plurality of winding holding portions configured to hold a portion of the winding; and a plurality of coil terminals having winding connection portion connected to the winding;

wherein when one end portion of the winding is referred to as first end portion and the other end portion of the winding is referred to as second end portion, a first end portion and a second end portion of the winding are wound around and held on same winding holding portion one or more times, the first end portion is a winding start portion of the winding and the second end portion is a winding end portion of the winding, and the first end portion and the second end portion are located at the winding holding portion, and the winding has two or more coils between the first end portion and the second end portion.

2. The stator according to claim 1, further comprising:

an insulator interposed between the stator core and the winding, wherein the insulator integrally has the winding holding portion, the winding holding portion has a plurality of engaging grooves formed to line up in a predetermined direction, and the first end portion and the second end portion are wound in alignment so as to engage with the engaging grooves.

3. The stator according to claim 2, wherein the insulator has a tooth insulating portion provided around the tooth and a flange portion provided on a tip side of the tooth, when a direction parallel to a rotation axis of the rotary electric machine is defined as an axial direction, and a direction perpendicular to the rotation axis is defined as a radial direction, the winding holding portion is formed to protrude radially inward from one axial side of the flange portion, when in a cross section orthogonal to the radial direction of the winding holding portion, a corner portion on the other side in the axial direction is defined as a rotor side corner portion, and a radius of curvature of the rotor side corner is larger than a wire diameter of the winding.

4. The stator according to claim 1, wherein the coil terminal integrally has the winding holding portion, the winding holding portion has a plurality of engaging grooves formed to line up in a predetermined direction, and the first end portion and the second end portion are wound in alignment so as to engage with the engaging grooves.

5. The stator according to claim 1, wherein the first end portion extends from the winding holding portion through the winding connection portion to a tooth, the second end portion extends from the tooth through the winding connection portion to the winding holding portion, and the first end portion and the second end portion of the winding are wound around the same winding connection portion.

6. The stator according to claim 1, wherein the first end portion has a first winding portion;

the second end portion has a second winding portion; and the second winding portion is wound so as to overlap the first winding portion.

7. The stator according to claim 1, wherein the first end portion has a first winding portion;

the second end portion has a second winding portion;

the first winding portion engages engaging grooves formed in the winding holding portion; and the second winding portion is wound so as to overlap the first winding portion.

* * * * *